United States Patent [19]

Ahlgren et al.

[11] 4,110,175
[45] Aug. 29, 1978

[54] ELECTRODIALYSIS METHOD

[75] Inventors: Richard M. Ahlgren, Waukesha; Burnett M. Schneider, Wind Lake, both of Wis.

[73] Assignee: Aqua-Chem, Inc., Milwaukee, Wis.

[21] Appl. No.: 742,360

[22] Filed: Nov. 15, 1976

Related U.S. Application Data

[63] Continuation-in-part of Ser. No. 701,111, Jun. 30, 1976, abandoned.

[51] Int. Cl.² .................. B01D 13/02; A23C 21/00; A23C 9/14
[52] U.S. Cl. .................. 204/180 P; 204/301; 426/34; 426/40; 426/41
[58] Field of Search ............ 204/180 P, 301; 426/34, 426/41, 40

[56] References Cited

U.S. PATENT DOCUMENTS

| 3,086,928 | 4/1963 | Schulz | 204/180 P X |
|---|---|---|---|
| 3,165,415 | 1/1965 | Kilburn et al. | 204/180 P X |
| 3,330,749 | 7/1967 | Kuwata et al. | 204/180 P |
| 3,369,906 | 2/1968 | Chen | 204/180 P X |
| 3,433,726 | 3/1969 | Parsi et al. | 204/180 P |
| 3,475,216 | 10/1969 | Walon | 127/46 |
| 3,484,356 | 12/1969 | Goujard | 204/180 P |
| 3,870,613 | 3/1975 | Nakamura et al. | 204/180 P |

Primary Examiner—Arthur C. Prescott
Attorney, Agent, or Firm—Fred Wiviott

[57] ABSTRACT

An electrodialysis method for deacidifying a feedstream comprises a first cell defined by anion-selective membranes and bounded by a pair of cells defined by the anion-selective membranes and a pair of cation-selective membranes. The solution to be treated is fed to the first membrane cell, a basic solution and a concentrating solution are delivered, respectively, to one of the adjacent cells, and an electric field is applied across the assembly. Hydroxyl anions from the basic solution pass into the first cell for neutralizing the acid hydrogen cation while the acid anion passes into one of the adjacent cells through which also flows the basic solution cation to maintain electrical balance.

6 Claims, 1 Drawing Figure

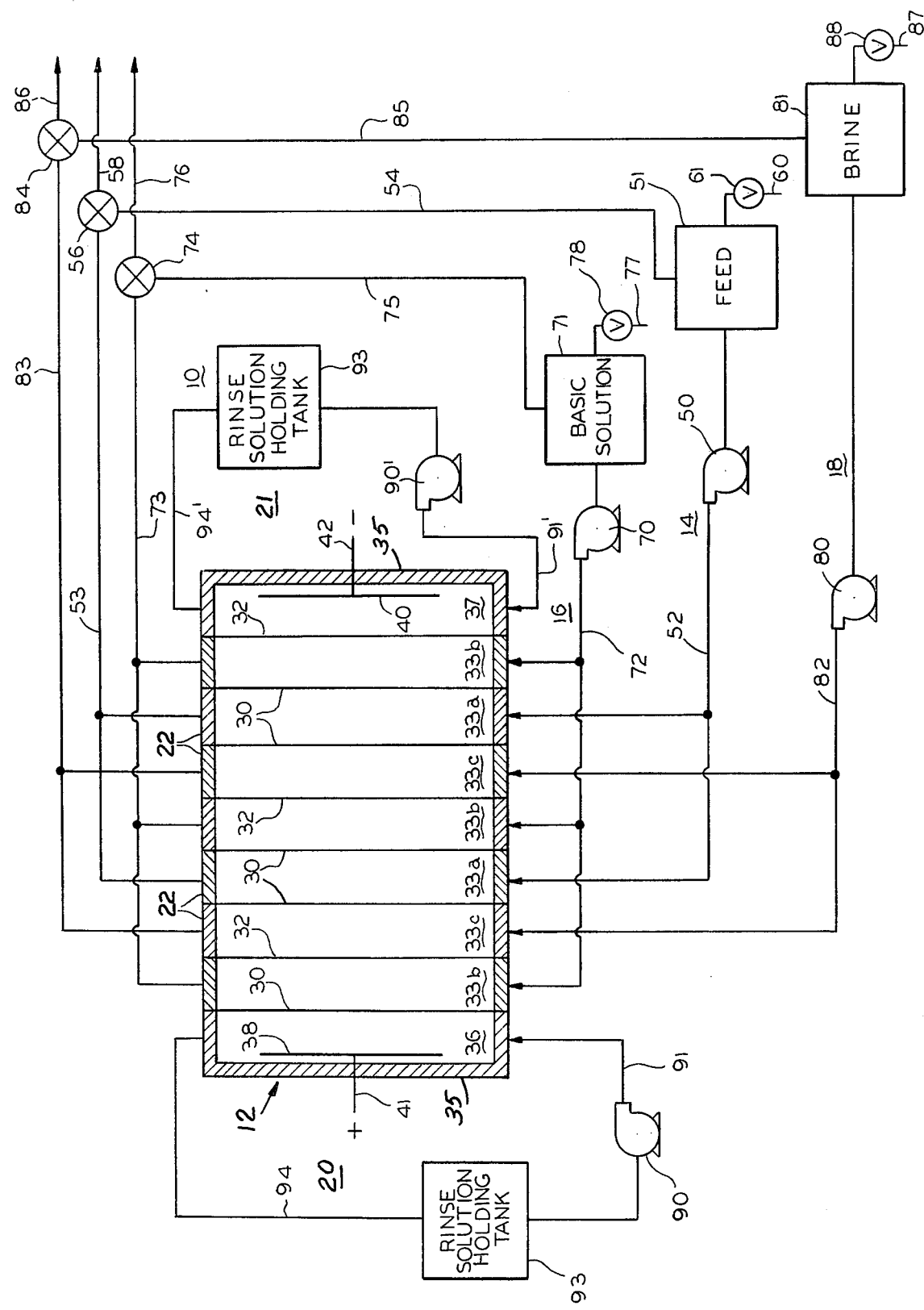

ELECTRODIALYSIS METHOD

RELATED APPLICATIONS

This is a continuation-in-part of application Ser. No. 701,111, filed June 30, 1976, now abandoned.

BACKGROUND OF THE INVENTION

This invention relates to fluid separation and permeation.

One method of permeation separation involves electrodialysis wherein the solution to be demineralized is fed into one or more cells defined by ion-selective membranes. When an electric field is applied across the separation cells, negative ions are drawn through anion-permeable membranes toward the anode, whie positive ions are drawn through cation-permeable membranes toward the cathode whereby the feed solution is continually deionized. This method has been widely used for deacidifying such substances a whey, which contains lactic acid and citrus fruit juices which contain citric acid. Conventional electrodialysis methods and apparatus have not been wholly satisfactory, however, because of the relatively long process times.

Another method of deacidifying feed solutions involves batch mixing. This method often results in polarized areas in which over-neutralization occurs resulting in undesirable reactions such as denaturation or flavor modifications.

SUMMARY OF THE INVENTION

It is a general object of the present invention to provide a new and improved permeation separation method for deacidifying a feed solution.

A further object of the present invention is to provide an electrodialysis method for deacidifying a feed solution more rapidly than conventional methods and apparatus.

Another object of the invention is to provide a method for deacidifying a feed solution wherein excess quantities of base chemicals are not required.

A still further object of the invention is to provide a method for deacidifying a feed solution in a uniform manner where polarization is minimized.

How these and other objects and advantages of the present invention are accomplished will become apparent from the detailed description thereof taken with the accompanying drawing. Generally, however, in a preferred form, the invention comprises providing a permeation separation device having a first cell defined by anion-selective membranes flanked by two cells defined by said anion selective membranes and cation-selective membranes, applying an electric field across the cells, and injecting an acid containing solution into a first cell and a basic solution and a carrier brine solution into the adjacent cells.

BRIEF DESCRIPTION OF THE DRAWING

The single FIGURE is a schematic diagram of permeation separation apparatus in which the method according to the preferred embodiments of the present invention may be carried out.

DESCRIPTION OF THE PREFERRED EMBODIMENT

The single FIGURE of the drawing schematically illustrates the permeation separation apparatus 10 to include a cell pack 12, a feed solution injection, recirculation and removal system 14, a brine recirculation and removal system 18, a basic solution recirculation system 16, an anolyte rinse system 20 and a catholyte rinse system 21. It will be appreciated the apparatus illustrated in the drawing is exemplary and modifications thereof can be made without departing from the scope of the present invention.

Cell pack 12 may be any well known type of membrane assembly such as a plate and frame assembly wherein a plurality of suitably perforated gaskets 22 support and seal the peripheries of a plurality of planar membranes 30 and 32 in parallel spaced relation to form a series of parallel prmeation cells 33$a$, 33$b$, 33$c$ and end cells 36 and 37. Each permeation cell is defined by two of the membranes and the gaskets and the end cells 36 and 37 are respectively defined by membranes 30 and 32 and end caps 35. Disposed within end cell 36 is a suitable anode 38 and a cathode 40 is disposed in the opposite end cell 37. Anode 38 and cathode 40 are connected respectively to the positive and negative terminals of a suitable power source (not shown) through leads 41 and 42. Cell pack 12 also includes suitable couplings (not shown) for admitting and removing liquids from each of cells 33$a$, 33$b$, 33$c$, 36 and 37. The components of the cell pack 12 are held in an abutting relation by suitable clamps or tie rods (not shown).

Membranes 30 are anion-permeable, cation-impermeable and membranes 32 are cation-permeable, anion-impermeable membranes. Suitable materials for use as membranes 30 and 32 include anion and cation exchange resins having active ion capture sites. Membranes 30 can be, for example MA-3148 anion exchange membranes manufactured by Ionac Chemicl Sybron Corporation, while membranes 32 can be, for example, MC-3142 cation exchange membranes available from the same source. Properties for these two membranes are set forth in the following Table I.

TABLE I

| Property | Membrane | |
|---|---|---|
| | MC-3142 | MA-3148 |
| Electrical Resistance (Ohm-cm$^2$) | | |
| 0.1N NaCl | 9.1 | 10.1 |
| 1.0N NaCl | 3.4 | 1.7 |
| % Permselectivity | | |
| 0.5N NaCl/1.0N NaCl | 94.1 | 90.0 |
| 0.2N NaCl/0.1N NaCl | 99.0 | 99.9 |
| Water Permeability | | |
| ml/hr/ft$^2$/30 psi | Negligible | Negligible |
| ml/hr/ft$^2$/10 psi | Negligible | Negligible |
| Thickness | 6 mils. | 7 mils. |
| Capacity | | |
| meq/g | 1.06 | 0.96 |
| meq/cm$^2$ | 0.021 | 0.019 |
| Dimensional Stability | Good | Good |
| Mullen Burst Strength | 185 | 190 |

In the illustrated embodiment, membranes 30 and 32 respectively form the membrane walls at end chambers 36 and 37, and proceeding from the left to the right of the FIGURE, the membrane arrangement after the end chamber membrane 30 is 32, 30, 30; 32, 30, 30; etc. Between end cells 36 and 37 are repetitive cell groups comprising a feed cell 33$a$ defined by a pair of anion-permeable membranes 30, and flanked by a basic solution cell 33$b$ defined by one of the anion-permeable membranes 30 and a cation-permeable membrane 32, and a permeate cell 33$c$ defined by the other anion permeable membranes 30 and a second cation-permeable membrane 32. The illustrated embodiment shows two such repetitive cell groups but any number may be employed ranging from 1 up to 50 or more. As an example, the membrane sheets may be 35 inches by 12 inches which provide an effective membrane area of 25 inches$^2$ per membrane when partially covered by gaskets 22.

Referring now to fluid transport systems 14, 16, 18, 20 and 21, the feed solution injection, recirculation and removal system 14 may include a pump 50 for circulating liquid to be concentrated and demineralized from a tank 51 to each of concentration cells 33a through inlet and outlet manifold pipes 52 and 53 and return pipe 54. In addition, a threeway valve 56 is connected to manifold 53 for selectively returning fluid exiting chamber 33a to tank 51 through pipe 54 or for discharging the deacidified, concentrated product through pipe 58. Tank 51 may also be connected by pipe 60 and valve 61 to a source of feed solution (not shown). It will be appreciated that when valve 56 is set to couple pipe manifold 53 to discharge pipe 58 and when valve 61 is set to couple pipe 60 to tank 51, the system is in a continuous mode. On the other hand, when valve 56 is set to couple pipe 53 to pipe 54 and valve 61 closed, the system is in a recirculation or batch mode.

The basic solution circulation system 16 is similar to system 14 and includes a circulating pump 70 for circulating a basic solution from a tank 71 through inlet manifold pipe 72, while depleted solution is removed from cells 33b by outlet manifold pipe 73. A three-way valve 74 is operable to connect manifold pipe 73 to holding tank 71 through pipe 75 or to discharge through pipe 76. By a proper setting of valve 73, system 16 can be operated for discharge or recirculation. Fresh basic solution can be provided to tank 71 through pipe 77 and valve 78.

Brine circulation and removal system 18 also includes a pump 80 for circulating brine solution from a tank 81 to waste brine cells 33c through inlet manifold pipe 82 while further concentrated waste is removed from these cells by outlet manifold pipes 83. A three-way valve 84 is operable is connect manifold pipe 83 to holding tank 81 by pipe 85 and to waste by pipe 86. Here again, by the proper adjustment of valve 84, the system 18 can be set for discharge or recirculation. Fresh liquid for the brine system can be provided through pipe 87 and valve 88.

The electrode rinse system 20 includes a pump 90 connected by an inlet pipe 91 to one end of cell 36 and to a rinse solution holding tank 93, which in turn is connected by pipe 94 to the other end of cell 36. Rinse system 21 for cell 37 is identical and the same components are identified by the same reference numerals as in system 20 except that they are distinguished by a prime (').

The method of operation of permeation apparatus 10 can be advantageously described in connection with the removal of lactic acid from cottage cheese whey so that the same can be used as a milk substitute in the manufacture of products such as ice cream, where the presence of lactic acid would inpart an unpleasant taste. For purposes of this description, it will be assumed that the content of the whey being treated is protein, lactic acid ($C_3H_6O_3$) and salt (KCl), it being appreciated that actually other ionic constituents are present in cheese whey. An electric field is initially applied between electrodes 38 and 40. For example, for the seven cell group of the illustrated embodiment using 3.5 × 12 inch membranes, voltages may range between 30–40 volts, at 1.5–3.5 amps., but these values should not be taken as limiting as suitable operating parameters will vary widely depending on the resistance of the entire cell pack 12. Raw whey is then introduced through pipe 60 into tank 51; a basic solution such as potassium hydroxide (KOH) is introduced through pipe 77 into tank 71 and a brine solution is introduced through pipe 87 to tank 81. Each of pumps 50, 70 and 80 are actuated and the valves 56, 74 and 84 are set in the desired mode. The feed solution contains protein, lactate ions ($C_3H_5O_3^-$) and hydrogen ions ($H^+$). Because cottage cheese whey normally contains some potassium and chloride ions, the basic solution is preferably potassium hydroxide (KOH) in the form of potassium ($K^+$) and hydroxide ($OH^-$) ions. As a result, the leakage of potassium ions into the feed stream will not adversely affect the taste of the resulting product. The lactate ions pass through the membranes 30 from cell 33a to cell 33c; the hydroxide ions will pass through membranes 30 from cell 33b to cell 33a and the potassium ions will pass through the membranes 32 from cell 33b to cell 33c. The hydroxide ions passing into cell 33a will combine with the hydrogen ions in said cell to form water while the protein will be rejected by both membranes. This deacidified protein will be withdrawn through manifold 53. The potassium and lactate in cell 33c will be withdrawn as a potassium lactate solution through manifold 83 and the depleted basic solution is withdrawn through manifold 73.

By appropriate adjustment of valves 56, 61, 74, 78, 84 and 88, the system can be run continuously. At the initial stages of the process, it may be desired to recirculate the deacidified protein concentrate until desired levels are reached. This is accomplished by setting the valves in the recirculation mode. After the desired levels are reached, the entire batch of protein solution may be discharged through pipe 58, or valve 56 may be opened slightly to bleed product from the system through pipe 58. If the latter method is selected, total liquid volumes can be maintained in system 14 by adjusting valve 61 to admit corresponding volumes of raw whey. The same procedures may be followed in systems 16 and 18, with potassium lactate and spent basic solution as desired. It is preferred to rinse electrode cells 36 and 37 continuously by passing a diluted sulphuric acid solution through the cells using electrode rinse systems 20 and 21. Sodium sulphate may be substituted for the sulphuric acid and a number of additional electrode rinse compositions are known to the electrodialysis art.

Table I shows that the water permeability of membranes 30 and 32 is negligible, and for this reason circulating solutions should be pumped through system 18 to carry ash from cells 33c. Again, suitable solutions can be chosen from those known to the electrodialysis art, one example being a 0.5 to 1.0% sodium chloride solution in distilled water.

In one example of the present invention, the feed stream was single strength acid whey having about 6% total solids and an acid content of about 0.4–0.5% by weight. The acid was principally lactic acid although other titratable acids were also present to a minor degree. The ash or salt content, principally KCl was about 0.5% by weight. The membrane stock included five repetitive cell groups each including a feed cell 33a, a basic solution cell 33b and a brine cell 33c and the membrane dimensions were about 25 cm. × 10 cm. The basic solution concentration was about 0.2–0.5% by weight KOH. With the apparatus operating in a recirculation mode, it was found that about 70% of the acid was removed at a treatment rate of about one pound of whey solids per hour per square foot of membrane surface. This compares with the conventional electrodialysis treatment method and apparatus having alternate anion and cation permeable membranes where the treatment rate to achieve a 70% acid reduction was about 0.25-0.3 pounds per hour per square foot of membrane surface, although the amount of ash removal was greater than in the method and apparatus of the invention.

It may also be desirable from time to time to thoroughly cleanse the membranes within cell pack 12 using membrane cleaning procedures known to the art. In one such procedure, the entire cell pack is rinsed with water, rinsed with a caustic cleaning solution, rinsed with water, rinsed with an acidic cleaning solution and again rinsed thoroughly with water at intervals which will depend on the types of feed solutions and products encountered. Because cheese whey provides such an excellent base for bacterial growth, it may be necessary to clean apparatus 10 daily when the system is being used for cheese whey separation. The cleaning solution may be introduced through system 14 or otherwise.

In another example of the present invention, the feed stream was orange juice having an acid content of about 1.22% by weight. The acid was principally citric acid ($C_6H_8O_7$). The basic solution concentration was about 0.97% by weight NaOH and the concentration stream was about 0.66% by weight NaCl. With the apparatus operating in a recirculation mode, it was found that the acid content of the orange juice was reduced to about 0.79% by weight while concentration of the basic solution was reduced to about 0.77% by weight NaOH and the concentrating solution increased to about 0.77% by weight citrate and NaCl. In addition, the following results were also obtained:

| Production Rate: | |
| --- | --- |
| Acid removal lb/hr/ft$^2$ of membrane | 0.0246 - 0.0328 |
| Orange juice processed lb/hr/ft$^2$ of 6.6 - 11.3 membrane | |
| Power Required: | |
| KwHr/lb acid removed | 0.7 - 1.00 |
| KwHr/lb juice processed | 0.0033 |
| Chemical Requirements: | |
| lb NaOH/lb acid removed | 0.53 |
| lb NaOH/lb juice processed | 0.00228 |
| % of acid removed from solution | 35 |

While the specific examples employ potassium and sodium hydroxide as the basic solution, other solutions such as calcium hydroxide may be used. In addition to deacidifying whey and orange juice, the method may also be employed for deacidifying other feed streams.

The deacidification method of the present invention permits the stochiometric use of the base chemical. As a result, there is no excess quantity of chemical required resulting in greater economy and minimization of pollution. Further, the addition of hydroxyl ions to the product being deacidified is accomplished in a uniform manner so that gradients are minimized. This is substantially more desirable than prior art batch mixing processes in which over-neutralization in some portions of the solution cause undesirable reactions resulting in denaturation and flavor modification. In the present method, because the hydroxyl ion is added at a rate in direct proportion to the removal of other ions and over a wide area of the membrane surface, over-neutralization in concentrated locations is avoided.

While in the idealized case, the potassium ions are rejected by the membranes 30, some leakage of potassium ions across the membranes 30 will occur. The volume of such leakage will be approximately 5-10% of the potassium ions so that desalting of the solution to this extent will occur. Additional desalting, if desired, may be accomplished by any conventional process such as another electrodialysis stack containing alternate anion and cation membranes.

While the invention has been described in connection with particular preferred embodiments, the invention can be variously embodied and is to be limited solely by the claims which follow.

We claim:

1. A permeation separation process comprising providing an enclosure, a plurality of ion-selective membranes disposed in spaced relation to define a plurality of permeation cells within said enclosure wherein first and second ones of said membranes are anion-selective and are disposed in side-by-side relation to define a first one of said cells, and third and fourth ones of said membranes being cationselective membranes each disposed adjacent one of said first and second membranes and on the opposite sides thereof to define second and third cells adjacent said first cell, and an anode disposed on the side of said membranes most proximate to said third cell and a cathode on the side of said membranes most proximate to said second cell, passing a whey solution including lactate anions and hydrogen cations into said first cell, a basic solution containing metallic cations and hydroxyl anions into said second cell, and a carrier solution into said third cell, applying an electric field across said cells and between the anode and cathode, passing lactate anions through said first membrane and from said first cell into said third cell, passing hydroxyl anions from said second cell into said first cell for combination with the hydrogen cations therein to form water whereby the ionic concentration of said first cell is decreased, withdrawing from said first cell a whey solution having an acid concentration less than that of said first solution, withdrawing from said second cell a basic solution which is less concentrated than that passed into said cell and substantially uncontaminated by said lactate anions, and withdrawing from said third cell the lactate anions along with said carrier solution.

2. The method set forth in claim 1 wherein said basic solution is potassium hydroxide and said carrier solution includes a metallic cation and a halogen anion.

3. The method set forth in claim 1 wherein said basic solution is taken from the group consisting of KOH, NaOH and Ca$_2$.

4. The method set forth in claim 3 wherein brine solution is injected into said third cell.

5. The method set forth in claim 1 wherein said whey solution contains about 0.4-0.5% lactic acid and said basic solution includes about 0.2-1.5% KOH.

6. The method set forth in claim 5 wherein brine solution is injected into said third cell.

* * * * *